(12) United States Patent
Guo et al.

(10) Patent No.: US 12,725,883 B2
(45) Date of Patent: Sep. 1, 2026

(54) ELECTRODE ASSEMBLY, BATTERY CELL, BATTERY, AND ELECTRICAL APPARATUS

(71) Applicant: CONTEMPORARY AMPEREX TECHNOLOGY (HONG KONG) LIMITED, Hong Kong (CN)

(72) Inventors: Suogang Guo, Ningde (CN); Chenghua Fu, Ningde (CN); Yonghuang Ye, Ningde (CN); Chenchen Zhang, Ningde (CN); Wen Chang, Ningde (CN); Chang Zhu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 546 days.

(21) Appl. No.: 18/353,679

(22) Filed: Jul. 17, 2023

(65) Prior Publication Data

US 2023/0361429 A1 Nov. 9, 2023

Related U.S. Application Data

(63) Continuation of application No. PCT/CN2022/073265, filed on Jan. 21, 2022.

(30) Foreign Application Priority Data

Sep. 10, 2021 (CN) ........................ 202111062600.7

(51) Int. Cl.
*H01M 50/449* (2021.01)
*H01M 10/04* (2006.01)
(Continued)

(52) U.S. Cl.
CPC ..... *H01M 50/449* (2021.01); *H01M 10/0431* (2013.01); *H01M 10/0587* (2013.01);
(Continued)

(58) Field of Classification Search
None
See application file for complete search history.

(56) References Cited

U.S. PATENT DOCUMENTS 9,761,853 B2 9/2017 Umeyama et al.
2008/0038628 A1 2/2008 Yamauchi et al.
(Continued)

FOREIGN PATENT DOCUMENTS

CN 1244952 A 2/2000
CN 1805205 A 7/2006
(Continued)

OTHER PUBLICATIONS

Machine translation of CN212810367U, published on Mar. 26, 2021 (Year: 2021).*

(Continued)

*Primary Examiner* — Anca Eoff
(74) *Attorney, Agent, or Firm* — Anova Law Group, PLLC

(57) ABSTRACT

An electrode assembly includes a first electrode sheet, a second electrode sheet, and a first separator. The first electrode sheet and second electrode sheet are of opposite polarities, the first separator is configured to separate the first electrode sheet and the second electrode sheet. The first electrode sheet, the second electrode sheet, and the first separator are wound in a winding direction. The electrode assembly has a bending region. The bending region is provided with a second separator that is laminated with the first separator and configured to separate the first electrode sheet and the second electrode sheet adjacent to each other. At least part of ions deintercalated from the first electrode sheet are able to pass through the first separator and the second separator and be intercalated in the second electrode sheet.

18 Claims, 5 Drawing Sheets

(51) Int. Cl.

| | |
|---|---|
| ***H01M 10/0525*** | (2010.01) |
| ***H01M 10/0587*** | (2010.01) |
| ***H01M 10/42*** | (2006.01) |
| ***H01M 50/46*** | (2021.01) |
| ***H01M 50/466*** | (2021.01) |
| ***H01M 50/489*** | (2021.01) |
| ***H01M 50/491*** | (2021.01) |

(52) U.S. Cl.

CPC ....... *H01M 10/4235* (2013.01); *H01M 50/46* (2021.01); *H01M 50/466* (2021.01); *H01M 50/489* (2021.01); *H01M 50/491* (2021.01); *H01M 10/0525* (2013.01)

(56) References Cited

U.S. PATENT DOCUMENTS

| | | | | |
|---|---|---|---|---|
| 2008/0190841 | A1* | 8/2008 | Pascaly .............. | H01M 50/491 264/483 |
| 2013/0143090 | A1 | 6/2013 | Hosoya et al. | |
| 2014/0322577 | A1 | 10/2014 | Kakeya et al. | |
| 2020/0036034 | A1 | 1/2020 | Wang | |
| 2020/0144624 | A1 | 5/2020 | Zheng et al. | |
| 2020/0266415 | A1 | 8/2020 | Lee et al. | |

FOREIGN PATENT DOCUMENTS

| | | | |
|---|---|---|---|
| CN | 2798320 | Y | 7/2006 |
| CN | 1838451 | A | 9/2006 |
| CN | 100429822 | C | 10/2008 |
| CN | 101882693 | A | 11/2010 |
| CN | 201956407 | U | 8/2011 |
| CN | 102487150 | A | 6/2012 |
| CN | 104124478 | A | 10/2014 |
| CN | 205992575 | U | 3/2017 |
| CN | 206379432 | U | 8/2017 |
| CN | 207572477 | U | 7/2018 |
| CN | 108417399 | A | 8/2018 |
| CN | 109560252 | A | 4/2019 |
| CN | 109802164 | A | 5/2019 |
| CN | 110249473 | A | 9/2019 |
| CN | 209389153 | U | 9/2019 |
| CN | 110364769 | A | 10/2019 |
| CN | 111785861 | A | 10/2020 |
| CN | 112467231 | A | 3/2021 |
| CN | 212810367 | U | 3/2021 |
| CN | 112803081 | A | 5/2021 |
| CN | 214254496 | U | 9/2021 |
| CN | 214706007 | U | 11/2021 |
| CN | 216773319 | U | 6/2022 |
| CN | 115799656 | A | 3/2023 |
| EP | 4216326 | A1 | 7/2023 |
| JP | 2001229970 | A | 8/2001 |
| JP | 2006269424 | A | 10/2006 |
| JP | 2009224038 | A | 10/2009 |
| JP | 2011008929 | A | 1/2011 |
| JP | 2013037984 | A | 2/2013 |
| JP | 2013196835 | A | 9/2013 |
| JP | 2014029895 | A | 2/2014 |
| JP | 2015153454 | A | 8/2015 |
| JP | 2017027950 | A | 2/2017 |
| JP | 6183526 | B2 | 8/2017 |
| JP | 2018506820 | A | 3/2018 |
| JP | 2021118115 | A | 8/2021 |
| JP | 2023516411 | A | 4/2023 |
| JP | 2023549798 | A | 11/2023 |
| KR | 20060102251 | A | 9/2006 |
| WO | 99026306 | A1 | 5/1999 |
| WO | 2018036489 | A1 | 3/2018 |
| WO | 2018061971 | A1 | 4/2018 |
| WO | 2018155248 | A1 | 8/2018 |
| WO | 2020059873 | A1 | 3/2020 |
| WO | 2022036721 | A1 | 2/2022 |

OTHER PUBLICATIONS

The Japan Patent Office (JPO) Notice of Reasons for Refusal for Application No. 2024-514424 May 13, 2025 8 Pages (including translation).

The European Patent Office (EPO) The Extended European Search Report for Application No. 22866146.8, May 26, 2025 8 Pages.

State Intellectual Property Office of China Notice of Grant of Invention Patent Right for Application No. 202280005318.1, Jul. 1, 2025 7 pages (including translation).

China National Intellectual Property Administration (CNIPA) Office Action 1 for Application No. 202280005439.6, Jun. 18, 2024 10 Pages (including translation).

State Intellectual Property Office of China Notice of Grant of Invention Patent Right for Application No. 202111062600.7, Sep. 24, 2023 8 pages (including translation).

The World Intellectual Property Organization (WIPO) International Search Report for PCT/CN2022/073265 May 19, 2022 7 pages (including English translation).

The World Intellectual Property Organization (WIPO) International Search Report for PCT/CN2022/094253 Jul. 27, 2022 7 pages (including English translation).

The World Intellectual Property Organization (WIPO) International Search Report for PCT/CN2022/094258 Jul. 27, 2022 6 pages (including English translation).

The World Intellectual Property Organization (WIPO) International Search Report for PCT/CN2022/104991 Sep. 26, 2022 6 pages (including English translation).

The Japan Patent Office (JPO) Notice of Reasons for Refusal for Application No. 2023-543459 Oct. 3, 2024 10 Pages (including translation).

The Japan Patent Office (JPO) Search Report by Registered Search Organization Application No. 2023-543459 Aug. 28, 2024 34 Pages (including translation).

The European Patent Office (EPO) The Extended European Search Report for Application No. 22866238.3, Mar. 27, 2025 9 Pages.

The Japan Patent Office (JPO) Notice of Reasons for Refusal for Application No. 2023-543459 Mar. 11, 2025 8 Pages (including translation).

United States Patent and Trademark Office (USPTO) Non-Final Office Action for U.S. Appl. No. 18/372,230, filed Apr. 1, 2026 81 Pages.

The Japan Patent Office (JPO) Notice of Reasons for Refusal for Application No. 2024-514424 Apr. 14, 2026 8 Pages (including translation).

* cited by examiner

ELECTRODE ASSEMBLY, BATTERY CELL, BATTERY, AND ELECTRICAL APPARATUS

CROSS-REFERENCE TO RELATED APPLICATIONS

The present application is a continuation of International Application No. PCT/CN2022/073265, filed on Jan. 21, 2022, which claims priority to Chinese patent application 202111062600.7, entitled "ELECTRODE ASSEMBLY AND ITS RELATED BATTERY CELL, BATTERY, APPARATUS, AND MANUFACTURING METHOD" and filed on Sep. 10, 2021, the entire contents of which are incorporated herein by reference.

TECHNICAL FIELD

The present application relates to the technical field of batteries and, more specifically, to an electrode assembly and a manufacturing method and a manufacturing system therefor, a battery cell, a battery, and an electrical apparatus.

BACKGROUND

Battery cells are widely used in electronic devices such as mobile phones, laptops, battery vehicles, electric vehicles, electric planes, electric ships, electric toy cars, electric toy ships, electric toy planes and electric tools, and so on. The battery cells may include nickel-cadmium battery cells, nickel-hydrogen battery cells, lithium-ion battery cells, secondary alkaline zinc-manganese battery cells, and the like.

In the development of battery technologies, in addition to improving the performance of the battery cells, safety is also an issue that cannot be ignored. If the safety of a battery cell cannot be guaranteed, the battery cell cannot be used. Therefore, how to enhance the safety of the battery cells is an urgent technical problem to be solved in the battery technologies.

SUMMARY OF THE INVENTION

The present application provides an electrode assembly and a manufacturing method and a manufacturing system therefor, a battery cell, a battery, and an electrical apparatus, which can improve safety.

In a first aspect, an embodiment of the present application provides an electrode assembly, comprising a first electrode sheet, a second electrode sheet, and a first separator, the first electrode sheet and second electrode sheet being of opposite polarities, the first separator being used to separate the first electrode sheet and the second electrode sheet, and the first electrode sheet, the second electrode sheet, and the first separator being wound in a winding direction. The electrode assembly has a bending region, the bending region being provided with a second separator that is laminated with the first separator and used to separate the first electrode sheet and the second electrode sheet adjacent to each other; and at least part of ions deintercalated from the first electrode sheet are able to pass through the first separator and the second separator and be intercalated in the second electrode sheet.

In the present application, the first separator and the second separator jointly separate the first electrode sheet and the second electrode sheet in the bending region, so that even if lithium plating occurs in the bending region or burrs occur on the electrode sheets during the bending process, it is difficult for the lithium dendrites or burrs to pierce the first separator and the second separator at the same time, thus reducing the probability of conduction of the first electrode sheet and the second electrode sheet, effectively reducing the short circuit problem caused by damage of the separators in the electrode assembly, which can then effectively reduce the risk of failure of the electrode assembly and improve the service life and safety of the electrode assembly. Both the first separator and the second separator are capable of allowing ions to permeate through, which reduces the blockage of ions and ensures the capacity of the electrode assembly.

In some embodiments, the thickness of the second separator is greater than that of the first separator.

In the above implementation, the second separator is more difficult to be pierced compared to the first separator, which can effectively reduce the risk of damage of the second separator and improve safety.

In some embodiments, the second separator comprises a plurality of separation layers, the plurality of separation layers being laminated in a thickness direction of the second separator.

In the above implementation, the multilayer structure can improve the strength of the second separator, thus increasing the difficulty of the second separator being pierced and improving safety.

In some embodiments, the adjacent separation layers are bonded to each other.

In the above implementation, the plurality of separation layers are bonded together, which can reduce the risk of deflection between the plurality of separation layers during winding of the electrode assembly and ensures the effect of protection of the second separator in the bending region.

In some embodiments, the plurality of separation layers comprise a first separation layer and a second separation layer disposed adjacent to each other, the first separation layer being located between the second separation layer and the first separator. In the winding direction, end portions of the second separation layer are disposed in a misaligned manner with end portions of the first separation layer.

In the above implementation, the end portions of the second separation layer are disposed in a misaligned manner with the end portions of the first separation layer, which can allow the end portions of the second separation layer and the end portions of the first separation layer to squeeze different regions of the electrode sheet, thereby reducing the concentration of stress, reducing the risk of cracking of the electrode sheet, and improving the performance of the electrode sheet.

In some embodiments, in the winding direction, both ends of the second separation layer are beyond the first separation layer and attached to the first separator.

In the above implementation, the second separation layer is attached to the first separator and is capable of limiting the movement of the first separation layer in the winding direction, which can reduce the risk of deflection and misalignment of the first separation layer and the second separation layer in the winding direction during the charging and discharging processes, thus ensuring the protection effect of the second separator in the bending region and improving the safety.

In some embodiments, the electrode assembly further comprises a flat region connected to the bending region. The first separation layer is located as a whole in the bending region. Both ends of the second separation layer in the winding direction are located in the flat region.

In the above implementation, the first separation layer and the second separation layer can simultaneously provide protection in the bending region so as to reduce the risk of short circuit and improve safety. The first separation layer as a whole is located in the bending region, which can avoid affecting the transmission of ions in the flat region by the first separation layer and ensure the charging and discharging performance in the flat region. Both ends of the second separation layer in the winding direction are located in the flat region, so that the end portions of the second separation layer can be misaligned with the end portions of the first separation layer, thereby reducing the concentration of stress.

In some embodiments, the first separation layer is attached to the first separator.

The above implementation can reduce the risk of deflection and misalignment of the first separation layer in the winding direction, thus ensuring the protection effect of the first separation layer in the bending region and improving safety.

In some embodiments, the material of the separation layer is the same as that of the first separator, and the thickness of the separation layer is equal to that of the first separator.

In the above implementation, the first separator and the second separator can be made of separators of the same specifications, which can simplify the process and reduce costs.

in some embodiments, the porosity of the second separator is greater than or equal to that of the first separator.

In the above implementation, the second separator has a better ion permeability, so as to reduce the blockage of ions by the second separator and to ensure the capacity of the electrode assembly.

In some embodiments, in the bending region, the second separator is arranged at least between the first electrode sheet and the second electrode sheet that are adjacent to each other on the innermost side.

The above implementation can arrange a second separator in a region where the lithium plating problem is serious, so as to effectively reduce the short circuit problem caused by damage of the separator in the electrode assembly and improve the service life and safety of the electrode assembly.

In some embodiments, the bending region is provided with a plurality of second separators, the adjacent second separators being separated by the first electrode sheet or the second electrode sheet. among the adjacent second separators, the thickness of the second separator on the inner side is greater than that of the second separator on the outer side.

In the above implementation, the second separator on the inner side has a greater thickness so as to reduce the risk of being pierced as much as possible; and the second separator on the outer side has a low risk of being pierced, so it can have a smaller thickness to save the amount of use of the second separator and increase the energy density of the electrode assembly.

In some embodiments, the electrode assembly further comprises a flat region connected to the bending region, both ends of the second separator in the winding direction being located in the flat region.

In the above implementation, the second separator can completely separate the first electrode sheet from the second electrode sheet, so as to improve safety.

In some embodiments, the second separator is attached to the outer surface of the first separator.

In the above implementation, the second separator is attached to the outer surface of the first separator, which not only can reduce the risk of deflection and misalignment of the second separator in the winding direction during the charging and discharging processes, but also can enable the second separator to stretch under the action of the first separator so as to reduce the risk of wrinkling of the second separator.

In some embodiments, the second electrode sheet is a negative electrode sheet and the second separator is attached to the outer surface of the second electrode sheet.

In the above implementation, the second separator is attached to the outer surface of the second electrode sheet, and the second separator is stretched under the action of the second electrode sheet, which can reduce the risk of wrinkling of the second separator.

In a second aspect, an embodiment of the present application provides a battery cell comprising a shell and an electrode assembly of any of the embodiments of the first aspect, the electrode assembly being accommodated in the shell.

In a third aspect, an embodiment of the present application provides a battery comprising a plurality of battery cells of the second aspect.

In a fourth aspect, an embodiment of the present application provides an electrical apparatus comprising a battery cell of the second aspect, the battery cell being used to provide electrical energy.

In a fifth aspect, an embodiment of the present application provides a manufacturing method for an electrode assembly, comprising:

providing a first electrode sheet, a second electrode sheet, a first separator, and a second separator; and winding the first electrode sheet, the second electrode sheet, and the first separator in a winding direction and forming a bending region, wherein the first electrode sheet and the second electrode sheet are of opposite polarities and the first separator is used to separate the first electrode sheet and the second electrode sheet; the bending region is provided with a second separator that is laminated with the first separator and used to separate the first electrode sheet and the second electrode sheet adjacent to each other; and at least part of ions deintercalated from the first electrode sheet are able to pass through the first separator and the second separator and be intercalated in the second electrode sheet.

In a sixth aspect, an embodiment of the present application provides a manufacturing system for an electrode assembly, comprising a provision apparatus and a winding apparatus. The provision apparatus is used for providing a first electrode sheet, a second electrode sheet, a first separator, and a second separator. The winding apparatus is used for winding the first electrode sheet, the second electrode sheet, and the first separator in a winding direction and forming a bending region. The first electrode sheet and the second electrode sheet are of opposite polarities and the first separator is used to separate the first electrode sheet and the second electrode sheet; the bending region is provided with a second separator that is laminated with the first separator and used to separate the first electrode sheet and the second electrode sheet adjacent to each other; and at least part of ions deintercalated from the first electrode sheet are able to pass through the first separator and the second separator and be intercalated in the second electrode sheet.

DESCRIPTION OF DRAWINGS

In order to illustrate the technical solutions of the embodiments of the present application more clearly, the following briefly introduces the drawings required in the embodiments of the present application. Obviously, the drawings described below are only some embodiments of the present application. For those of ordinary skill in the art, other drawings can also be obtained according to the drawings without any creative effort.

Figure 1:
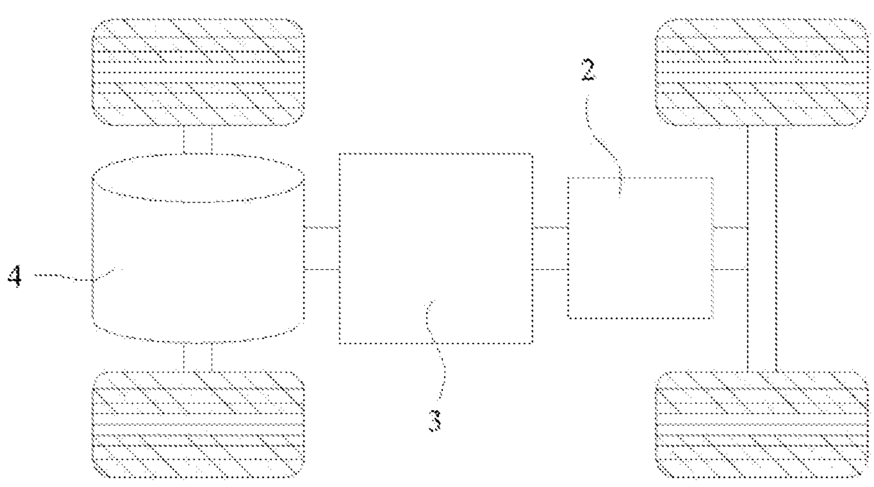
FIG. 1 is a schematic structural view of a vehicle provided by some embodiments of the present application.

In the accompanying drawings, the accompanying drawings are not drawn to actual scale.

DETAILED DESCRIPTION

For the objects, technical solutions and advantages of the embodiments of the present application to be clearer, the technical solutions in the embodiments of the present application will be clearly and completely described below in conjunction with the drawings in the embodiments of the present application, and it is apparent that the described embodiments are a part of the embodiments of the present application rather than all the embodiments. Based on the embodiments in the present application, all other embodiments obtained by those of ordinary skill in the art without creative effort fall within the protection scope of the present application.

Unless otherwise defined, all technical and scientific terms used herein have the same meanings as those commonly understood by those skilled in the art to which the present application belongs. The terms used in the specification of the present application herein are merely for the purpose of describing specific embodiments, but are not intended to limit the present application. The terms "comprising" and "having" and any variations thereof in the specification and the claims of the present application as well as the foregoing description of the drawings are intended to cover non-exclusive inclusions. The terms "first", "second", etc., in the specification and claims of the present application or in the accompanying drawings above are used to distinguish between different objects and are not intended to describe a particular order or relationship of precedence.

In the description of the present application, it is to be understood that the orientation or location relationships indicated by the terms "center", "transverse", "length", "width", "up", "down", "front", "back", "left", "right", "vertical", "horizontal", "top", "bottom", "inside", "outside", "axial", "radial", "circumferential" and the like are based on the orientation or location relationships shown in the accompanying drawings, and are only for convenience and simplification of the description of the present application, but do not indicate or imply that the apparatuses or elements referred to must have particular orientations, be constructed and operated in particular orientations, and therefore cannot be construed as a limitation of the present application.

In the description of the present application, it should be noted that the terms "mounting", "connecting", "connection" and "attachment" should be understood in a broad sense, unless otherwise explicitly specified or defined. For example, it may be a fixed connection, a detachable connection, or an integrated connection; and it may be a direct connection or an indirect connection through an intermediate medium, or may be a communication between the interior of two elements. For those of ordinary skill in the art, the specific meanings of the above terms in the present application can be understood according to specific situations.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is understood, both explicitly and implicitly, by those skilled in the art that the embodiments described herein may be combined with other embodiments.

Herein, the term "and/or" is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship. In this disclosure, the phrases "at least one of A, B, and C" and "at least one of A, B, or C" both mean only A, only B, only C, or any combination of A, B, and C.

In the present application, "a plurality of" means two or more (including two); similarly, "a plurality of groups" means two or more groups (including two groups), and "a plurality of sheets" means two or more sheets (including two sheets).

In the present application, the battery cell may comprise a lithium-ion secondary battery cell, a lithium-ion primary battery cell, a lithium-sulfur battery cell, a sodium/lithium-ion battery cell, a sodium-ion battery cell, a magnesium-ion battery cell, or the like, which is not limited in the embodiments of the present application. The battery cell may be cylindrical, flat, rectangular, or in other shapes, which is also not limited in the embodiments of the present application. The battery cells are generally divided into three types according to encapsulating manners: cylindrical battery cells, prismatic rectangular battery cells, and pouch cells, which are not limited in the embodiments of the present application.

The battery cell comprises an electrode assembly and an electrolyte solution. The electrode assembly is composed of a positive electrode sheet, a negative electrode sheet and a separator. The battery cell operates mainly relying on movement of metal ions between the positive electrode sheet and the negative electrode sheet. The positive electrode sheet comprises a positive electrode current collector and a positive electrode active material layer. A surface of the positive electrode current collector is coated with the positive electrode active material layer. Current collectors not coated with the positive electrode active material layer protrude from the current collectors coated with the positive electrode active material layer. The current collectors not coated with the positive electrode active material layer serve as positive electrode tabs. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode sheet comprises a negative electrode current collector and a negative electrode active material layer. A surface of the negative electrode current collector is coated with the negative electrode active material layer. Current collectors not coated with the negative electrode active material layer protrude from the current collectors coated with the negative electrode active material layer. The current collectors not coated with the negative electrode active material layer serve as negative electrode tabs. The material of the negative electrode current collector may be copper, and the negative electrode active material may be carbon, silicon, or the like. In order to ensure that no fusing occurs when a large current passes, there are a plurality of positive electrode tabs which are laminated together, and there are a plurality of negative electrode tabs which are laminated together. The material of the separator can be PP (polypropylene) or PE (polyethylene), and so on. Many design factors, such as energy density, cycle life, discharge capacity, charge-discharge rate and other performance parameters, should be considered in the development of the battery technology. In addition, the safety of the battery also needs to be taken into account.

The battery mentioned in the embodiments of the present application refers to a single physical module comprising one or more battery cells to provide a higher voltage and capacity. For example, the battery mentioned in the present application may include a battery module, a battery pack, or the like. The battery generally comprises a box body for encapsulating one or more battery cells. The box body can prevent liquids or other foreign matters from affecting the charging or discharging of the battery cells.

The separator is electrically insulating and is provided between the positive electrode sheet and the negative electrode sheet, and its main function is to prevent internal short circuit in the electrode assembly caused by the contact of the positive electrode sheet with the negative electrode sheet. The separator has a large number of through micro-holes, which can ensure the free passage of electrolyte ions, and in particular, the separator has good permeability to lithium ions. As an example, the separator comprises a separation substrate layer and a functional layer located on the surface of the separation substrate layer, wherein the separation substrate layer may be made of at least one of polypropylene, polyethylene, ethylene-propylene copolymer, polybutylene terephthalate, etc., and the functional layer may be a mixture layer of ceramic oxide and binder.

The separator plays a very important role in an electrode assembly, which can directly lead to short circuit, performance and life degradation of the electrode assembly.

When the battery cell is being charged, the metal ions are deintercalated from the positive electrode active material layer and intercalated in the negative electrode active material layer, but some abnormalities may occur, leading to the precipitation of metal ions. Take a lithium-ion battery cell as an example, because of insufficient lithium intercalation space in the negative electrode active material layer, too much resistance for lithium ions to be intercalated in the negative electrode active material layer or too fast for lithium ions to be deintercalated from the positive electrode active material layer, and other causes, the lithium ions deintercalated cannot be intercalated in the negative electrode active material layer of the negative electrode in the same amount, and the lithium ions that cannot be intercalated in the negative electrode can only obtain electrons on the surface of the negative electrode sheet, thus forming metal lithium single substance, which is the phenomenon of lithium plating.

During the process of research and development, the inventor also found that the wound electrode assembly is more prone to lithium plating in its bending region. After further research, the inventor found that the main reason for this lithium plating phenomenon is that the positive and negative electrode sheets located in the bending region need to be bent, and the positive electrode active material layer and the negative electrode active material layer can easily produce concentration of stress during the bending process and cause their respective active materials to fall off. The fall-off of the active material, especially the fall-off of the active material on the negative electrode sheet, may cause the amount of lithium intercalation sites in the negative electrode active material layer of this negative electrode sheet to be less than the amount of lithium ions that can be provided by the positive electrode active material layer of its adjacent positive electrode sheet, thus resulting in the phenomenon of lithium plating.

When lithium plating is serious, the lithium ions deintercalated can form lithium crystals on the surface of the negative electrode sheet; and because the separator is thin, the lithium crystals can easily pierce the separator, causing the risk of a short circuit between the adjacent positive electrode sheet and negative electrode sheet, thus causing a safety hazard.

In addition, because the positive electrode sheet or negative electrode sheet is easy to produce some micro-cracks and burrs in the process of winding and bending, and under the effect of greater stress, the separator is easy to be pierced, which causes short circuit in the electrode assembly, and then easily leads to the phenomena of thermal runaway, such as fire and explosion, in the battery cell.

In view of this, the inventor of the present application proposes an electrode assembly, which increases the number of layers of the separator in the bending region, thus reducing the probability of damages of the separator in the electrode assembly, reducing the risk of internal short circuit of the first and second electrode sheets, and improving the service life and safety.

The electrode assembly described in the embodiments of the present application is applicable to battery cells, batteries, and electrical apparatuses using batteries.

The electrical apparatus may be, but not limited to, a vehicle, a mobile phone, a portable device, a laptop computer, a ship, a spacecraft, an electric toy, an electric tool, and the like. The vehicle may be a fuel vehicle, a gas vehicle or a new energy vehicle. The new energy vehicle may be an all-electric vehicle, a hybrid vehicle, an extended-range electric vehicle, or the like. The spacecraft comprises airplanes, rockets, space shuttles, spaceships, and the like. The electric toy comprises fixed or mobile electric toys, such as game consoles, electric car toys, electric ship toys and electric aircraft toys. The electric tool comprises metal cutting electric tools, grinding electric tools, assembly electric tools and railway electric tools, such as electric drills, electric grinders, electric wrenches, electric screwdrivers, electric hammers, impact drills, concrete vibrators and electric planers. No special limitation is imposed on the electrical apparatus in the embodiments of the present application.

For the convenience of illustration, the following embodiments are illustrated using an example in which the electrical apparatus is a vehicle.

FIG. 1 is a schematic structural view of a vehicle provided by some embodiments of the present application. As shown in FIG. 1, the vehicle 1 is provided with a battery 2 inside, and the battery 2 can be provided at the bottom or head or tail of the vehicle 1. The battery 2 may be used to power the vehicle 1. For example, the battery 2 may be used as an operating power source of the vehicle 1.

The vehicle 1 may further comprise a controller 3 and a motor 4, wherein the controller 3 is used to control the battery 2 to power the motor 4, for example, for the operating power demand when the vehicle 1 is starting, navigating and driving.

In some embodiments of the present application, the battery 2 not only may serve as an operating power source of the vehicle 1, but also may serve as a driving power source of the vehicle 1, thus replacing or partially replacing fuel or natural gas to provide driving power for the vehicle 1.

Figure 2:
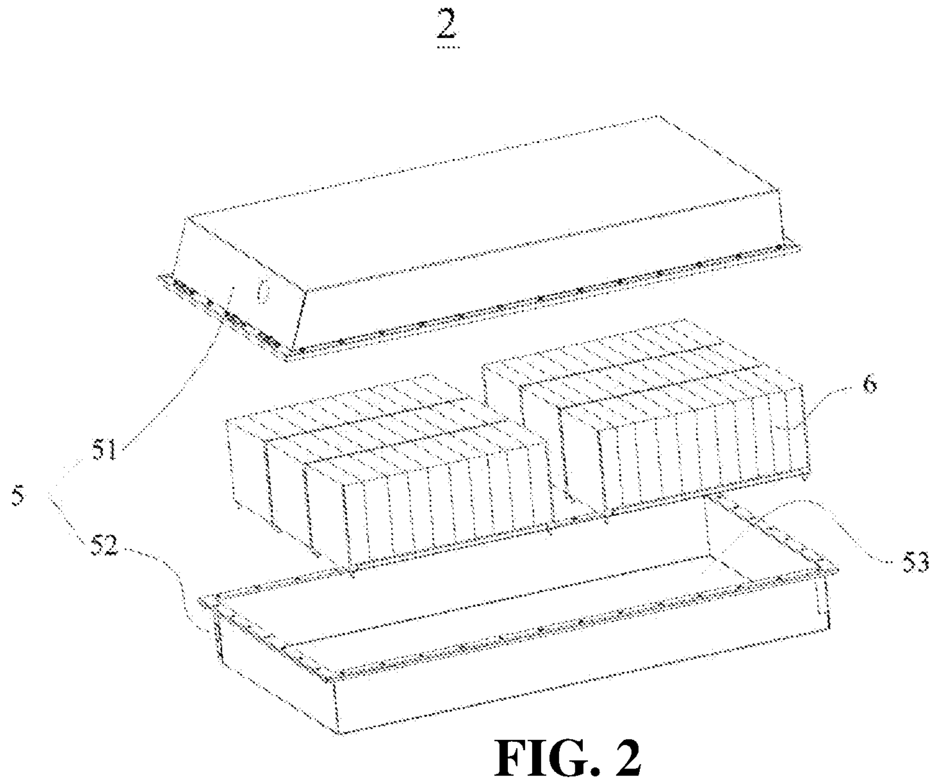
FIG. 2 is an exploded schematic view of a battery provided in some embodiments of the present application.

FIG. 2 is an exploded schematic view of a battery provided in some embodiments of the present application. As shown in FIG. 2, the battery 2 comprises a box body 5 and a battery cell 6, the battery cell 6 being accommodated in the case 5.

The box body 5 is used to accommodate the battery cell 6, and the box body 5 may be of a variety of structures. In some embodiments, the box body 5 may include a first box body section 51 and a second box body section 52, the first box body section 51 and the second box body section 52 covering each other and the first box body section 51 and the second box body section 52 together defining an accommodating space 53 for accommodating the battery cell 6. The second box body section 52 can be of a hollow structure with one end open, the first box body section 51 is of a plate-like structure, and the first box body section 51 covers the open side of the second box body section 52 to form the box body 5 having the accommodating space 53; and both the first box body section 51 and the second box body section 52 can also be of a hollow structure with one side open, and the open side of the first box body section 51 covers the open side of the second box body section 52 to form the box body 5 having the accommodating space 53. Of course, the first box body section 51 and the second box body section 52 can be of a variety of shapes, such as a cylinder, a rectangular solid, or the like.

To improve the sealing performance of the first box body section 51 and the second box body section 52 after they are connected, a sealing member, such as a sealant, a seal ring, etc., may also be provided between the first box body section 51 and the second box body section 52.

Assuming that the first box body section 51 covers the top of the second box body section 52, and the first box body section 51 can also be called an upper box cover, and the second box body section 52 can also be called a lower box body.

In the battery 2, there are multiple battery cells 6. The multiple battery cells 6 can be in series or parallel or in parallel-series connection with each other, wherein the parallel-series connection means that there are both series and parallel connections among battery cells 6. The multiple battery cells 6 can be directly connected together in series or in parallel or in parallel-series connection, and then the whole composed of the multiple battery cells 6 can be accommodated in the box body 5; and of course, the multiple battery cells 6 can be connected in series or in parallel or in mixed connection to form a battery module first, then multiple battery modules can be connected in series or in parallel or in mixed connection to form a whole, and accommodated in the box body 5.

Figure 3:
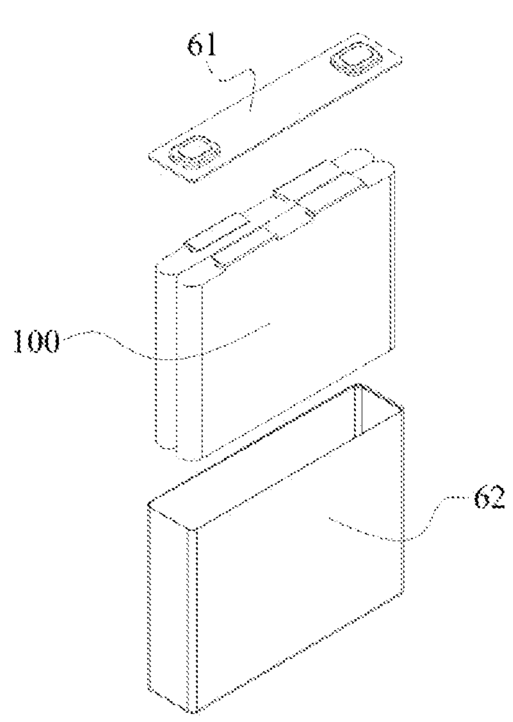
FIG. 3 is an exploded schematic view of a battery cell provided in some embodiments of the present application.

FIG. 3 is an exploded schematic diagram of a battery cell provided in some embodiments of the present application. A battery cell 6 is the smallest unit that makes up the battery 2. As shown in FIG. 3, the battery cell 6 comprises a shell, an electrode assembly 100, and other functional components, with the electrode assembly 100 being accommodated within the shell.

In some embodiments, the shell comprises an end cover 61 and a case 62.

The end cover 61 is a component that covers the opening in the case 62 to isolate the internal environment of the battery cell 6 from the external environment. Without limitation, the shape of the end cover 61 can be adapted to the shape of the case 62 to fit the case 62. Optionally, the end cover 61 can be made of a material (such as aluminum alloy) with a certain hardness and strength, so that the end cover 61 is less likely to deform when subjected to extrusion and collision, which allows the battery cell 6 to have a higher structural strength and improved safety performance. The end cover 61 can be provided with functional components such as electrode terminals. The electrode terminal can be used for electrical connection with the electrode assembly 100 for use in outputting or inputting electrical energy from or to the battery cell 6.

In some embodiments, the end cover 61 may also be provided with a pressure relief mechanism for releasing the internal pressure when the internal pressure or temperature of the battery cell 6 reaches a threshold value. The end cover 61 may also be made of a variety of materials, such as copper, iron, aluminum, stainless steel, aluminum alloy, plastic, etc., and the embodiments of the present application are not particularly limited in this regard.

In some embodiments, an insulating member may also be provided on the inner side of the end cover 61, and the insulating member can be used to isolate the electrical connection components inside the case 62 from the end cover 61 to reduce the risk of short circuit. As an example, the insulating member may be plastic, rubber, etc.

The case 62 is an assembly for fitting the end cover 61 to form the internal environment of the battery cell 6, wherein the formed internal environment can be used to accommodate the electrode assembly 100, electrolyte solution, and other components. The case 62 and the end cover 61 may be separate components, and an opening may be provided in the case 62, and the internal environment of the battery cell 6 may be formed by making the end cover 61 cover the opening at the opening. Without limitation, it is also possible to make the end cover 61 and the case 62 integrated. Specifically, the end cover 61 and the case 62 may first form a common connecting face before the other components enter the case, and then the end cover 61 is made to cover the case 62 when the interior of the case 62 needs to be encapsulated. The case 62 may be of various shapes and various sizes, for example, rectangular solid shape, cylindrical shape, hexagonal shape, etc. Specifically, the shape of the case 62 may be determined based on the specific shape and size of the electrode assembly 100. The case 62 may also be made of a variety of materials, such as copper, iron, aluminum, stainless steel, aluminum alloy, plastic, etc., and the embodiments of the present application are not particularly limited in this regard.

The electrode assembly 100 is a component of the battery cell 6 that is impregnated in the electrolyte solution for electrochemical reactions to occur. The case 62 may contain one or more electrode assemblies 100 inside. The electrode assembly 100 is formed primarily by winding the positive electrode sheet and the negative electrode sheet, and is usually provided with a separator between the positive electrode sheet and the negative electrode sheet. The portions of the positive and negative electrode sheets having active materials form the main body part of the electrode assembly 100, and the portions of the positive and negative electrode sheets not having active materials each form a tab. The positive electrode tab and the negative electrode tab may be located jointly at one end of the main body part or at the two ends of the main body part, respectively. During the charging and discharging process of the battery cell, the positive and negative electrode active materials react with the electrolyte solution and the tabs are connected to the electrode terminals to form a current loop.

Figure 4:
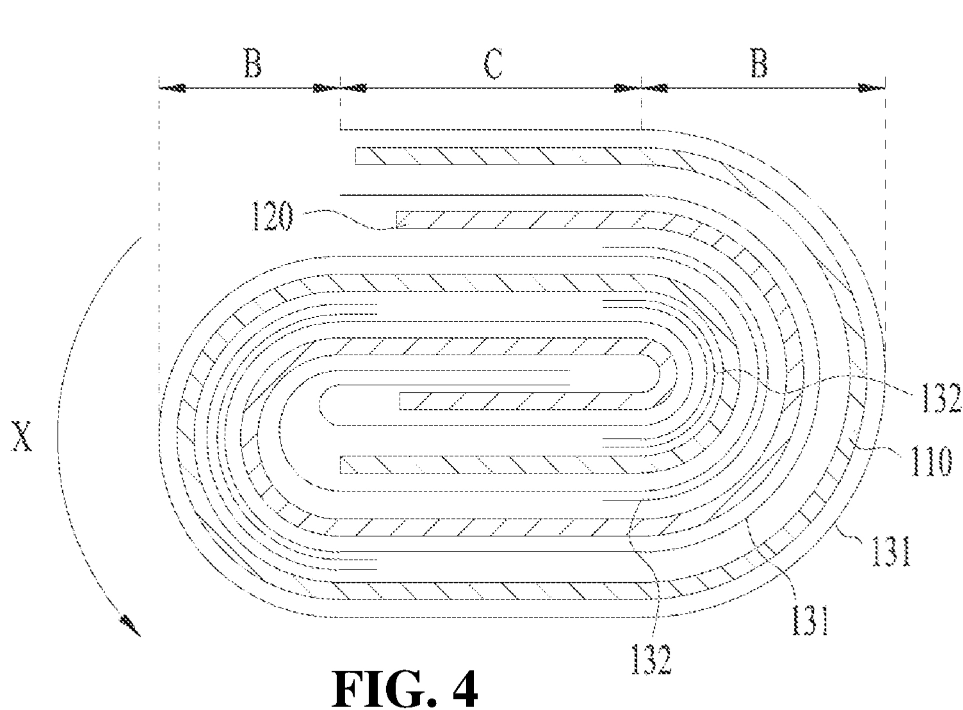
FIG. 4 is a schematic structural view of an electrode assembly provided in some embodiments of the present application.
Figure 5:
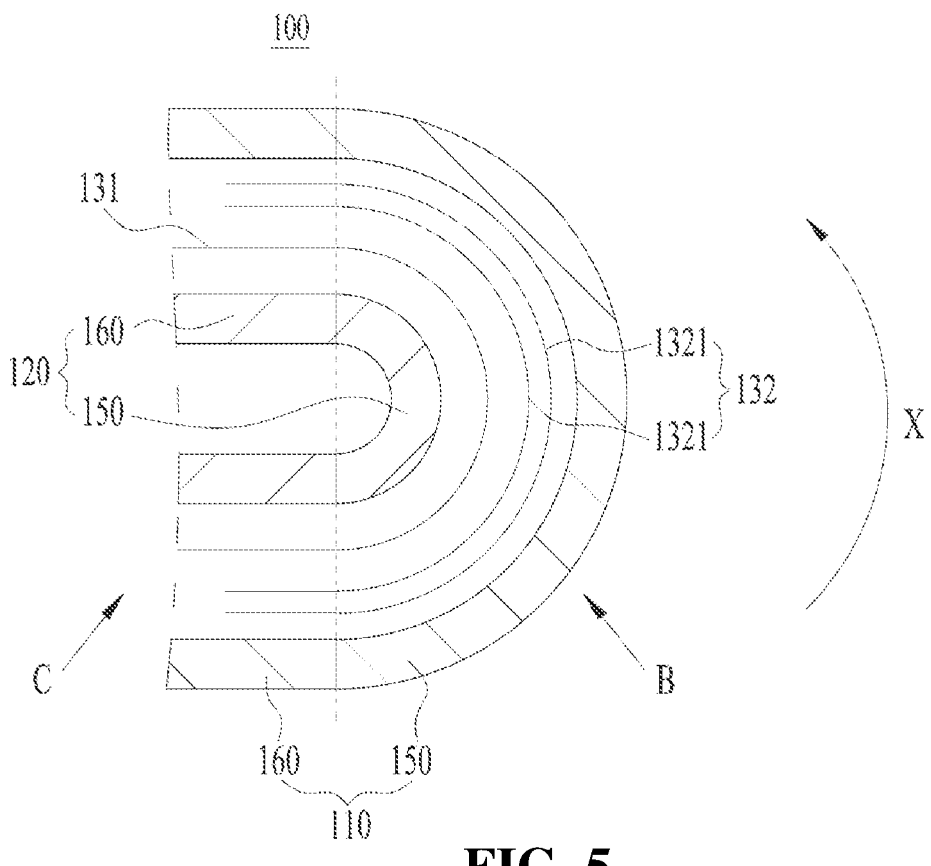
FIG. 5 is an enlarged schematic view of a portion of the electrode assembly shown in FIG. 4.

FIG. 4 is a schematic structural view of an electrode assembly provided in some embodiments of the present application; and FIG. 5 is an enlarged schematic view of a portion of the electrode assembly shown in FIG. 4.

As shown in FIG. 4 and FIG. 5, the electrode assembly 100 of the embodiments of the present application comprises a first electrode sheet 110, a second electrode sheet 120, and a first separator 131, the first electrode sheet 110 and the second electrode sheet 120 being of opposite polarities, the first separator 131 being used to separate the first electrode sheet 110 and the second electrode sheet 120, and the first electrode sheet 110, the second electrode sheet 120, and the first separator 131 being wound in a winding direction X. The electrode assembly 100 has a bending region B, the bending region B being provided with a second separator 132, the second separator 132 being laminated with the first separator 131 and used to separate the first electrode sheet 110 and the second electrode sheet 120 adjacent to each other; and at least part of ions deintercalated from the first electrode sheet 110 are able to pass through the first separator 131 and the second separator 132 and be intercalated in the second electrode sheet 120.

In this embodiment, the winding direction X is the direction in which the first electrode sheet 110, the second electrode sheet 120, and the first separator 131 are wound circumferentially from the inside out. As an example, in the drawing, the winding direction X is a counterclockwise direction.

One of the first electrode sheet 110 and the second electrode sheet 120 is a positive electrode sheet and the other is a negative electrode sheet.

Both the first separator 131 and the second separator 132 have a large number of through micro-holes, which can ensure free passage of metal ions; for example, the first separator 131 and the second separator 132 have good permeability to lithium ions and substantially cannot block the passage of lithium ions. As an example, the materials of the first separator 131 and the second separator 132 may be PP (polypropylene) or PE (polyethylene), and the like.

The first separator 131 and the second separator 132 may be made of the same material or may be made of different materials. In this embodiment, there is no limitation on the thicknesses of the first separator 131 and the second separator 132.

The separators mentioned in the present application can also be called separator films, which are shown as lines in the drawing, but in fact the separator also have a thickness.

The first electrode sheet 110, the second electrode sheet 120, and the first separator 131 are all of strip-like structures. In some embodiments, two first separators 131 are provided. In the present application, the first electrode sheet 110, one first separator 131, the second electrode sheet 120, and the other first separator 131 can first be laminated in sequence, and then wound more than two turns to form a wound structure.

In the present application, the winding apparatus winds the first electrode sheet 110, the second electrode sheet 120, and the first separator 131 into several turns, wherein each turn can be constructed with several layers, and one turn means: starting calculating from a point on the electrode assembly 100 as the start end, traveling one round in the winding direction X to reach another point to position a termination end, where the termination end is in a straight line with the start end and the center of this round, and the start end is located between the termination end and the center of this round. Each round comprises in sequence the first electrode sheet layer, the first separator layer, the second electrode sheet layer, and the second separator layer, wherein the first separator 131 is used to separate the first electrode sheet 110 and the second electrode sheet 120 of adjacent rounds or adjacent layers in the same round.

The first separator 131 should be understood as a layer of separator between the first electrode sheet 110 and the second electrode sheet 120 in the related art, i.e., a base separator, and the second separator 132 should be understood as an added separator, i.e., an additional separator.

The electrode assembly 100 may be of a variety of shapes, for example, the electrode assembly 100 may be cylindrical, flat, prismatic (e.g., trigonal, quadratic or hexagonal) or other shapes.

Both the first electrode sheet 110 and the second electrode sheet 120 include a plurality of bending portions 150 located in a bending region B. The bending region B is a region of the electrode assembly 100 having a bending structure, wherein the portions of the first electrode sheet 110 located in the bending region B (i.e., the bending portions 150 of the first electrode sheet 110) and the portions of the second electrode sheet 120 located in the bending region B (i.e., the bending portions 150 of the second electrode sheet 120) are all provided in a bending manner. As an example, the bending portions 150 of the first electrode sheet 110 and the bending portions 150 of the second electrode sheet 120 are substantially bent into an arc shape.

In this embodiment, the bending region B may be provided with one second separator 132, or may be provided with a plurality of second separators 132.

The second separator 132 is laminated between the electrode sheet and the first separator 131, wherein the electrode sheet may be the first electrode sheet 110 or the second electrode sheet 120. In some examples, the second separator 132 may be disposed independently between the electrode sheet and the first separator 131, that is, the second separator 132 is separately laminated from the electrode sheet and the first separator 131, respectively, and there is no connection relationships, such as adhesion, either between the second separator 132 and the electrode sheet or between the second separator 132 and the first separator 131. In some other examples, the second separator 132 may also be attached to the surface of the electrode sheet or to the surface of the first separator 131; attachment means an affixed connection, for example, the second separator 132 may be attached to the electrode sheet or the first separator 131 by means of bonding, etc.

The second separator 132 may be located in the bending region B of the electrode assembly 100 as a whole, or may be located only partially in the bending region B of the electrode assembly 100.

In this embodiment, the first separator 131 and the second separator 132 jointly separate the first electrode sheet 110 and the second electrode sheet 120 in the bending region B, so that even if lithium plating occurs in the bending region B or burrs occur on the electrode sheets during the bending process, it is difficult for the lithium dendrites or burrs to pierce the first separator 131 and the second separator 132 at the same time, thus reducing the probability of conduction of the first electrode sheet 110 and the second electrode sheet 120, effectively reducing the short circuit problem caused by damage of the separators in the electrode assembly 100, which can then effectively reduce the risk of failure of the electrode assembly 100 and improve the service life and safety of the electrode assembly 100. Both the first separator 131 and the second separator 132 are capable of allowing ions to permeate through, which reduces the blockage of ions and ensures the capacity of the electrode assembly 100.

In some embodiments, the thickness of the second separator 132 is greater than that of the first separator 131.

In this embodiment, the second separator 132 is more difficult to be pierced compared to the first separator 131, which can effectively reduce the risk of damage of the second separator 132 and improve safety.

In some embodiments, the porosity of the second separator 132 is greater than or equal to that of the first separator 131.

Porosity is the percentage of the volume of pores in the block-like material to the total volume of the material in its natural state. In general, the porosity is tested by a true density test method.

In this embodiment, the second separator 132 has a better ion permeability, so as to reduce the blockage of ions by the second separator 132 and to ensure the capacity of the electrode assembly 100.

In some embodiments, the porosity of the second separator 132 is greater than that of the first separator 131.

In some embodiments, in the bending region B, the second separator 132 is arranged at least between the first electrode sheet 110 and the second electrode sheet 120 that are adjacent to each other on the innermost side.

In the bending region B, the innermost first electrode sheet 110 and second electrode sheet 120 are more prone to lithium plating problems and burr problems. Specifically, compared to the other bending portions 150 of the first electrode sheet 110, the curvature of the innermost bending portion 150 of the first electrode sheet 110 is greater and the stress on it is greater, so the active material fall-off of the innermost bending portion 150 of the first electrode sheet 110 is more serious and burrs are more likely to be generated. Similarly, compared to the other bending portions 150 of the second electrode sheet 120, the curvature of the innermost bending portion 150 of the second electrode sheet 120 is greater and the stress on it is greater, so the active material fall-off of the innermost bending portion 150 of the second electrode sheet 120 is more serious and burrs are more likely to be generated.

This embodiment can arrange a second separator 132 in a region where the lithium plating problem is serious, so as to effectively reduce the short circuit problem caused by damage of the separator in the electrode assembly 100 and improve the service life and safety of the electrode assembly 100.

In some embodiments, the bending region B is provided with a plurality of second separators 132, the second separators 132 that are adjacent to each other being separated by the first electrode sheet 110 or the second electrode sheet 120. Among the second separators 132 that are adjacent to each other, the thickness of the second separator 132 on the inner side is greater than that of the second separator 132 on the outer side.

In the bending region B, the curvature of the bending portions 150 gradually decreases from the inside to the outside, and the stress on the bending portions 150 also gradually decreases; that is, in the bending region B, the lithium plating problem is more severe in the inner bending portions 150 than in the outer bending portions 150.

In this embodiment, the second separator 132 on the inner side has a greater thickness so as to reduce the risk of being pierced as much as possible; and the second separator 132 on the outer side has a low risk of being pierced, so it can have a smaller thickness to save the amount of use of the second separator 132 and increase the energy density of the electrode assembly 100.

In some embodiments, all the plurality of second separators 132 are provided independently. The position of each of the second separators 132 can be freely set as desired.

In some embodiments, the electrode assembly 100 further comprises a flat region C connected to the bending region B, both ends of the second separator 132 in the winding direction X being located in the flat region C.

The flat region C is a region where the electrode assembly 100 has a flat structure, and both the first electrode sheet 110 and the second electrode sheet 120 include a plurality of flat portions 160 located in the flat region C. The flat portion 160 within the flat region C is provided in a substantially flat manner, and as an example, the flat portion 160 is substantially plate-shaped.

As an example, there are two bending regions B and they are connected to two ends of the flat region C, respectively. At least one of the bending regions B is provided with a second separator 132; optionally, the two bending regions B are both provided with a second separator 132.

In this embodiment, the second separator 132 can completely separate the first electrode sheet 110 from the second electrode sheet 120, so as to improve safety.

In some embodiments, the second separator 132 is attached to the outer surface of the first separator 131.

The second separator 132 may be attached to the first separator 131 as a whole, or may be only partially attached to the first separator 131. As an example, the second separator 132 is attached to the first separator 131 at both ends along the winding direction X.

In this embodiment, the second separator 132 is attached to the first separator 131, so that the risk of deflection and misalignment of the second separator 132 along the winding direction X can be reduced during the charging and discharging process, thus ensuring the protection effect of the second separator 132 in the bending region B and improving the safety.

When the first separator 131 is being bent, its inner surface is compressed while the outer surface is stretched. If the second separator 132 is attached to the inner surface of the first separator 131, the second separator 132 may be wrinkled under the influence of the first separator 131, which affects the transmission of ions. In this embodiment, the second separator 132 is attached to the outer surface of the first separator 131 and the second separator 132 is stretched under the action of the first separator 131, which can reduce the risk of wrinkling of the second separator 132.

In the present application, the inner side and the outer side are relative to the winding center of the electrode assembly 100, with the side facing the winding center being the inner side and the side backing away from the winding center being the outer side. That is, the surface of the first separator 131 facing the winding center is the inner surface and the surface backing away from the winding center is the outer surface.

In some embodiments, the second separator 132 is bonded to the outer surface of the first separator 131 by hot pressing.

In some embodiments, the materials of both the first separator 131 and the second separator 132 may be PP (polypropylene) or PE (polyethylene). With this setup, the choice of material makes processing easier and less costly for commercial consideration.

In some embodiments, the first separator 131 can be made of PP (polypropylene) or PE (polyethylene), and the second separator 132 can be made of one of a polypropylene/ultra-high molecular weight polyethylene diaphragm/epoxy resin composite diaphragm, a porous polypropylene diaphragm, a coaxial composite nanofiber membrane, a porous diaphragm, a glass fiber battery diaphragm, or a PVDF-HFP polymer electrolyte diaphragm. Among them, the polypropylene/ultra-high molecular weight polyethylene diaphragm/epoxy resin composite diaphragm can improve the porosity and heat resistance of the diaphragm. The porous polypropylene diaphragm can combine both air permeability properties and piercing strength. The coaxial composite nanofiber membrane consists of composite nanofibers of a fluorine-containing insulating skin layer and a polyimide core layer, which not only can ensure excellent infiltration, liquid retention and ion conductivity, but also have high mechanical strength and heat resistance performance. The porous diaphragm is prepared by mixing polyolefin with silica or other inorganic substances. The glass fiber battery diaphragm consists of alkali-free glass fiber, PET (polyester), and PA (polyamide). With this setup, the second separator 132 has greater piercing resistance, mechanical strength, and greater inhibition of lithium dendrites.

In some embodiments, the second separator 132 comprises a plurality of separation layers 1321, the plurality of separation layers 1321 being laminated in a thickness direction of the second separator 132.

In this embodiment, the multilayer structure can improve the strength of the second separator 132, thus increasing the difficulty of the second separator 132 being pierced and improving safety.

In some embodiments, the adjacent separation layers 1321 are bonded to each other.

In FIGS. 4 and 5, the separation layers 1321 are shown as lines; although there are gaps between the separation layers 1321 in the drawings, the adjacent separation layers 1321 may actually be adhesively bonded.

In this embodiment, the plurality of separation layers 1321 are bonded together, which can reduce the risk of deflection between the plurality of separation layers 1321 during winding of the electrode assembly 100 and ensures the effect of protection of the second separator 132 in the bending region B.

In some embodiments, the plurality of separation layers 1321 may be bonded together by hot pressing.

In some embodiments, the material of the separation layer 1321 is the same as that of the first separator 131, and the thickness of the separation layer 1321 is equal to that of the first separator 131.

In this embodiment, the first separator 131 and the second separator 132 can be made of separators of the same specifications, which can simplify the process and reduce costs.

Figure 6:
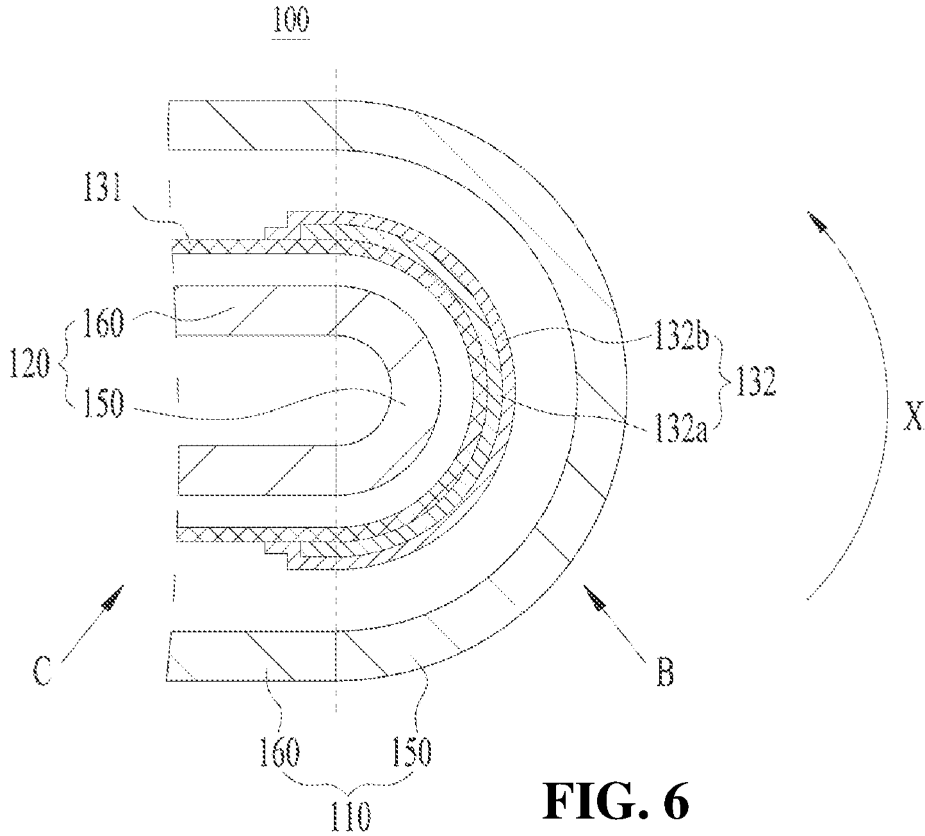
FIG. 6 is a partial schematic structural view of an electrode assembly provided in some other embodiments of the present application.

FIG. 6 is a partial schematic structural view of an electrode assembly provided in some other embodiments of the present application.

As shown in FIG. 6, in some embodiments, the plurality of separation layers comprise a first separation layer **132*a* and a second separation layer 132*b* disposed adjacent to each other, the first separation layer 132*a* being located between the second separation layer 132*b* and the first separator 131. In the winding direction X, end portions of the second separation layer 132*b* are disposed in a misaligned manner with end portions of the first separation layer 132*a***.

Being disposed in a misaligned manner means that the end portions of the second separation layer **132*b* and the end portions of the first separation layer 132*a* do not overlap in the thickness direction of the second separator 132**.

As an example, two of the plurality of separation layers are the first separation layer **132*a* and the second separation layer 132*b***, respectively.

The two ends of the first separation layer **132*a* along the winding direction X are defined as the first end and the second end, respectively, and the two ends of the second separation layer 132*b*** along the winding direction X are defined as the third end and the fourth end, respectively. The third end is closer to the first end relative to the fourth end, and the fourth end is closer to the second end relative to the third end.

In this embodiment, the first end and the third end are disposed in a misaligned manner along the winding direction X. The second end and the fourth end can be disposed in an aligned manner along the winding direction X or can be disposed in a misaligned manner along the winding direction X.

During the process of charging and discharging, the first electrode sheet 110 and the second electrode sheet 120 expand and squeeze the first separation layer **132*a* and the second separation layer 132*b*. If the end portions of the first separation layer 132*a* and the end portions of the second separation layer 132*b* are aligned, the end portions of the first separation layer 132*a* and the end portions of the second separation layer 132*b*** will squeeze the same positions of the electrode sheet, thus leading to the concentration of stress and affecting the performance of the electrode sheet.

In this embodiment, the end portions of the second separation layer **132*b* are disposed in a misaligned manner with the end portions of the first separation layer 132*a*, which can allow the end portions of the second separation layer 132*b* and the end portions of the first separation layer 132*a*** to squeeze different regions of the electrode sheet, thereby reducing the concentration of stress, reducing the risk of cracking of the electrode sheet, and improving the performance of the electrode sheet.

In some embodiments, in the winding direction X, both ends of the second separation layer **132*b* are beyond the first separation layer 132*a* and attached to the first separator 131**.

The first separation layer **132*a* may be provided independently between the second separation layer 132*b* and the first separator 131 or may be attached to the second separation layer 132*b* or the first separator 131**.

In this embodiment, the second separation layer 132*b* is attached to the first separator 131 and can limit the movement of the first separation layer 132*a* in the winding direction X, which can reduce the risk of deflection and misalignment of the first separation layer 132*a* and the second separation layer 132*b* in the winding direction X during the charging and discharging processes, thus ensuring the protection effect of the second separator 132 in the bending region B and improving the safety.

In some embodiments, the first separation layer 132*a* is attached to the first separator 131.

The first separation layer 132*a* may be attached to the first separator 131 as a whole, or may be only partially attached to the first separator 131. As an example, the first separation layer 132*a* is attached to the first separator 131 at both ends along the winding direction X.

This embodiment can reduce the risk of deflection and misalignment of the first separation layer 132*a* in the winding direction X, thus ensuring the protection effect of the first separation layer 132*a* in the bending region B and improving safety.

Figure 7:
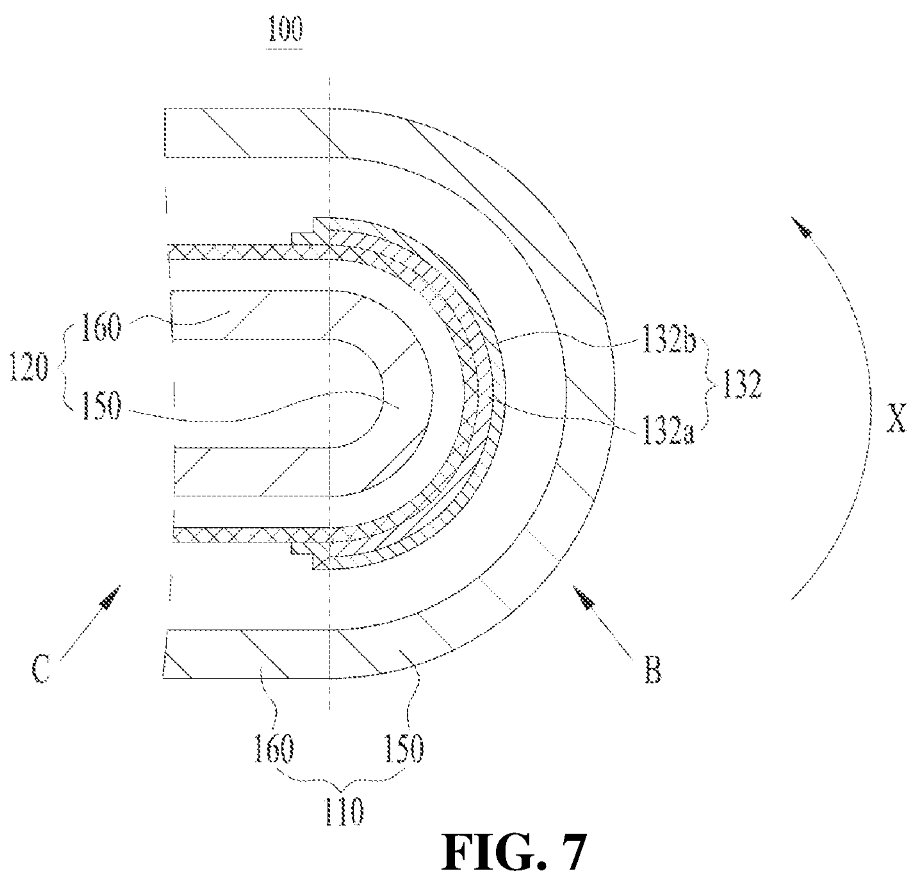
FIG. 7 is a partial schematic structural view of an electrode assembly provided in yet some other embodiments of the present application.

FIG. 7 is a partial schematic structural view of an electrode assembly provided in yet some other embodiments of the present application.

As shown in FIG. 7, in some embodiments, the electrode assembly 100 further comprises a flat region C connected to the bending region B. The first separation layer 132*a* is located as a whole in the bending region B. Both ends of the second separation layer 132*b* in the winding direction X are located in the flat region C.

In this embodiment, the first separation layer 132*a* and the second separation layer 132*b* can simultaneously provide protection in the bending region B so as to reduce the risk of short circuit and improve safety. The first separation layer 132*a* as a whole is located in the bending region B, which can avoid affecting the transmission of ions in the flat region C by the first separation layer 132*a* and ensure the charging and discharging performance in the flat region C. Both ends of the second separation layer 132*b* in the winding direction X are located in the flat region C, so that the end portions of the second separation layer 132*b* can be misaligned with the end portions of the first separation layer 132*a*, thereby reducing the concentration of stress.

In some embodiments, the end portions of the first separation layer 132*a* along the winding direction X are located at the junction of the flat region C and the bending region B.

Figure 8:
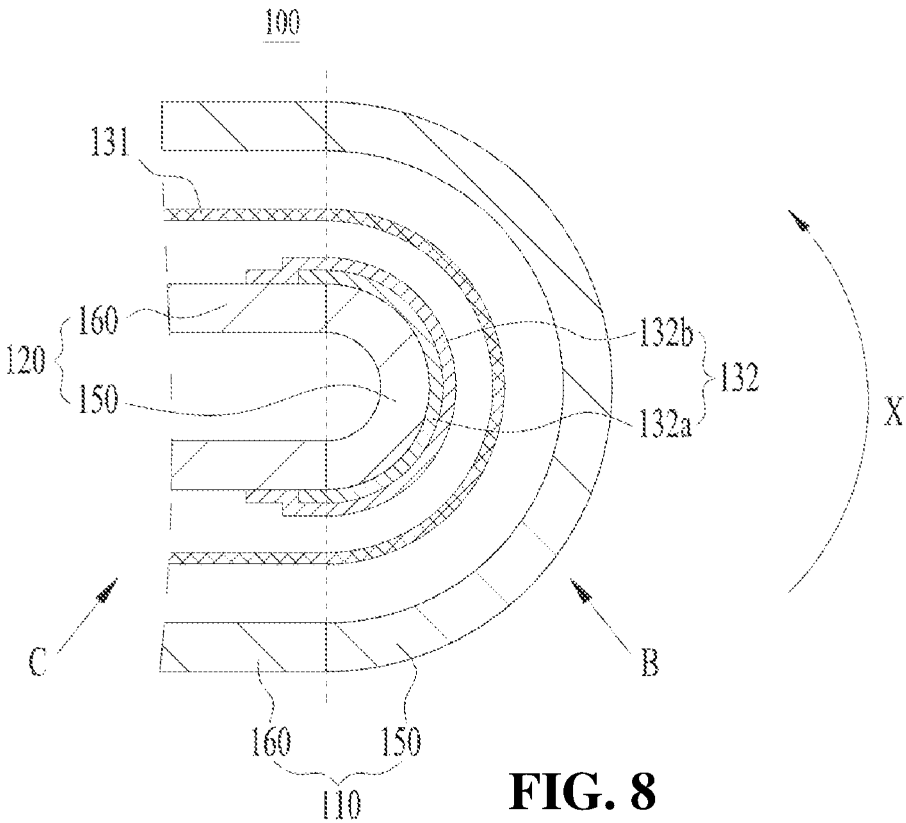
FIG. 8 is a partial schematic structural view of an electrode assembly provided in yet some other embodiments of the present application.

FIG. 8 is a partial schematic structural view of an electrode assembly provided in yet some other embodiments of the present application.

As shown in FIG. 8, the second electrode sheet 120 is a negative electrode sheet, and the second separator 132 is attached to the outer surface of the second electrode sheet 120.

In this embodiment, the second separator 132 is attached to the outer surface of the second electrode sheet 120, and the second separator 132 is stretched under the action of the second electrode sheet 120, which can reduce the risk of wrinkling of the second separator 132.

In the bending region B, the diameter of the positive electrode sheet on the outer side of the negative electrode sheet is larger than the diameter of the negative electrode sheet, so the area of the positive electrode active material layer of the positive electrode sheet on the outer side of the negative electrode sheet is larger than the area of the negative electrode active material layer of the negative electrode sheet, which causes the outer surface of the negative electrode sheet to be prone to lithium plating. This embodiment attaches the second separator 132 to the outer surface of the negative electrode sheet to reduce the risk of short circuit and improve safety.

Figure 9:
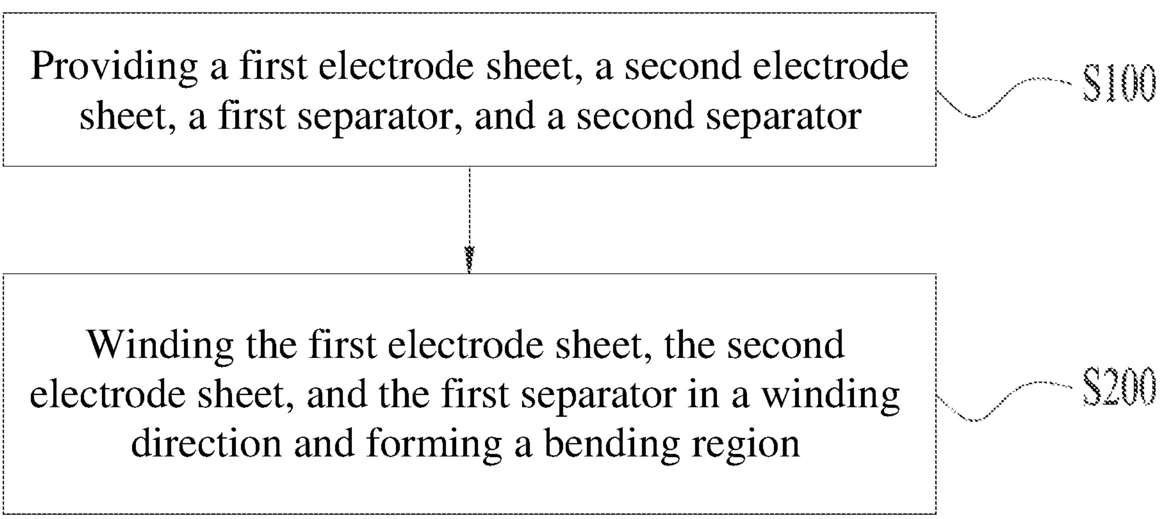
FIG. 9 is a schematic flow chart of a manufacturing method for an electrode assembly provided in some embodiments of the present application.

FIG. 9 is a schematic flow chart of a manufacturing method for an electrode assembly provided in some embodiments of the present application.

As shown in FIG. 9, the manufacturing method for an electrode assembly of embodiments of the present application comprises:

- S100: providing a first electrode sheet, a second electrode sheet, a first separator, and a second separator; and
- S200: winding the first electrode sheet, the second electrode sheet, and the first separator in a winding direction and forming a bending region,
- wherein the first electrode sheet and the second electrode sheet are of opposite polarities and the first separator is used to separate the first electrode sheet and the second electrode sheet; the bending region is provided with a second separator that is laminated with the first separator and used to separate the first electrode sheet and the second electrode sheet adjacent to each other; and at least part of ions deintercalated from the first electrode sheet are able to pass through the first separator and the second separator and be intercalated in the second electrode sheet.

It is to be noted that, for the relevant structure of the electrode assembly manufactured by the above manufacturing method for an electrode assembly, reference can be made to the electrode assembly provided in each of the above embodiments.

Figure 10:
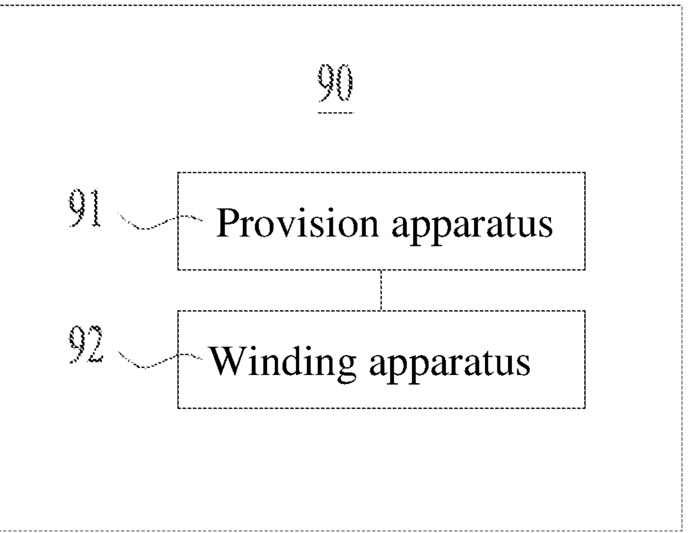
FIG. 10 is a schematic block diagram of a manufacturing system for an electrode assembly provided in some embodiments of the present application.

FIG. 10 is a schematic block diagram of a manufacturing system for an electrode assembly provided in some embodiments of the present application.

As shown in FIG. 10, the manufacturing system 90 for an electrode assembly of embodiments of the present application comprises a provision apparatus 91 and a winding apparatus 92. The provision apparatus 91 is used for providing a first electrode sheet, a second electrode sheet, a first separator, and a second separator. The winding apparatus 92 is used for winding the first electrode sheet, the second electrode sheet, and the first separator in a winding direction and forming a bending region. The first electrode sheet and the second electrode sheet are of opposite polarities and the first separator is used to separate the first electrode sheet and the second electrode sheet; the bending region is provided with a second separator that is laminated with the first separator and used to separate the first electrode sheet and the second electrode sheet adjacent to each other; and at least part of ions deintercalated from the first electrode sheet are able to pass through the first separator and the second separator and be intercalated in the second electrode sheet.

For the relevant structure of the electrode assembly manufactured by the above manufacturing system, reference can be made to the electrode assembly provided in the each of the above embodiments.

It should be noted that in case of no conflicts, the features of the embodiments in the present application may be combined with each other.

Finally, it should be noted that the above embodiments are used only to illustrate, instead of limiting, the technical solutions of the present application; although the present application is described in detail with reference to the preceding embodiments, it should be understood by those of ordinary skill in the art that: it is still possible to modify the technical solutions recorded in the preceding embodiments, or to equivalently replace some of the technical features therein; and these modifications or replacements do not make the essence of the corresponding technical solutions depart from the spirit and scope of the technical solutions of the embodiments of the present application.

What is claimed is:

1. An electrode assembly comprising:

a first electrode sheet and a second electrode sheet having opposite polarities; and a first separator configured to separate the first electrode sheet and the second electrode sheet;

wherein:

the first electrode sheet, the second electrode sheet, and the first separator are wound in a winding direction;

the electrode assembly has a bending region, the bending region being provided with a second separator that is laminated with the first separator and configured to separate the first electrode sheet and the second electrode sheet adjacent to each other;

at least part of ions deintercalated from the first electrode sheet are able to pass through the first separator and the second separator and be intercalated in the second electrode sheet;

the second separator comprises a plurality of separation layers, the plurality of separation layers being laminated in a thickness direction of the second separator;

the plurality of separation layers comprise a first separation layer and a second separation layer disposed adjacent to each other, the first separation layer being located between the second separation layer and the first separator; and in the winding direction, end portions of the second separation layer are disposed in a misaligned manner with end portions of the first separation layer.

2. The electrode assembly according to claim 1, wherein a thickness of the second separator is greater than a thickness of the first separator.

3. The electrode assembly according to claim 1, wherein adjacent ones of the separation layers are bonded to each other.

4. The electrode assembly according to claim 1, wherein, in the winding direction, both ends of the second separation layer are beyond the first separation layer and attached to the first separator.

5. The electrode assembly according to claim 4, further comprising:

a flat region connected to the bending region;

wherein:

the first separation layer is located as a whole in the bending region; and both ends of the second separation layer in the winding direction are located in the flat region.

6. The electrode assembly according to claim 1, wherein the first separation layer is attached to the first separator.

7. The electrode assembly according to claim 1, wherein a material of the separation layers is same as a material of the first separator, and a thickness of one of the separation layers is equal to a thickness of the first separator.

8. The electrode assembly according to claim 1, wherein a porosity of the second separator is greater than or equal to a porosity of the first separator.

9. The electrode assembly according to claim 1, wherein in the bending region, the second separator is arranged at least between the first electrode sheet and the second electrode sheet that are adjacent to each other on an innermost side.

10. The electrode assembly according to claim 1, wherein:

the second separator is one of a plurality of second separators provided in the bending region, adjacent second separators of the second separators being separated by the first electrode sheet or the second electrode sheet; and between the adjacent second separators, a thickness of one of the adjacent second separators on an inner side is greater than a thickness of another one of the adjacent second separators on an outer side.

11. The electrode assembly according to claim 1, further comprising:

a flat region connected to the bending region, both ends of the second separator in the winding direction being located in the flat region.

12. The electrode assembly according to claim 1, wherein the second separator is attached to an outer surface of the first separator.

13. The electrode assembly according to claim 1, wherein the second electrode sheet is a negative electrode sheet, and the second separator is attached to an outer surface of the second electrode sheet.

14. A battery cell, comprising:

a shell; and the electrode assembly according to claim 1, the electrode assembly being accommodated within the shell.

15. A battery comprising a plurality of battery cells according to claim 14.

16. An electrical apparatus comprising the battery cell according to claim 14, the battery cell being used to provide electrical energy.

17. An electrode assembly comprising:

a first electrode sheet and a second electrode sheet having opposite polarities; and a first separator configured to separate the first electrode sheet and the second electrode sheet;

wherein:

the first electrode sheet, the second electrode sheet, and the first separator are wound in a winding direction;

the electrode assembly has a bending region, the bending region being provided with a second separator that is laminated with the first separator and configured to separate the first electrode sheet and the second electrode sheet adjacent to each other;

at least part of ions deintercalated from the first electrode sheet are able to pass through the first separator and the second separator and be intercalated in the second electrode sheet;

the second separator comprises a plurality of separation layers, the plurality of separation layers being laminated in a thickness direction of the second separator; and a material of the separation layers is same as a material of the first separator, and a thickness of one of the separation layers is equal to a thickness of the first separator.

18. An electrode assembly comprising:

a first electrode sheet and a second electrode sheet having opposite polarities; and a first separator configured to separate the first electrode sheet and the second electrode sheet;

wherein:

the first electrode sheet, the second electrode sheet, and the first separator are wound in a winding direction;

the electrode assembly has a bending region, the bending region being provided with a second separator that is laminated with the first separator and configured to separate the first electrode sheet and the second electrode sheet adjacent to each other;

at least part of ions deintercalated from the first electrode sheet are able to pass through the first separator and the second separator and be intercalated in the second electrode sheet; and a porosity of the second separator is greater than or equal to a porosity of the first separator.

* * * * *